Jan. 13, 1931. G. C. PEARSON 1,788,629
TOOL CHUCK
Filed Jan. 16, 1928 2 Sheets-Sheet 1
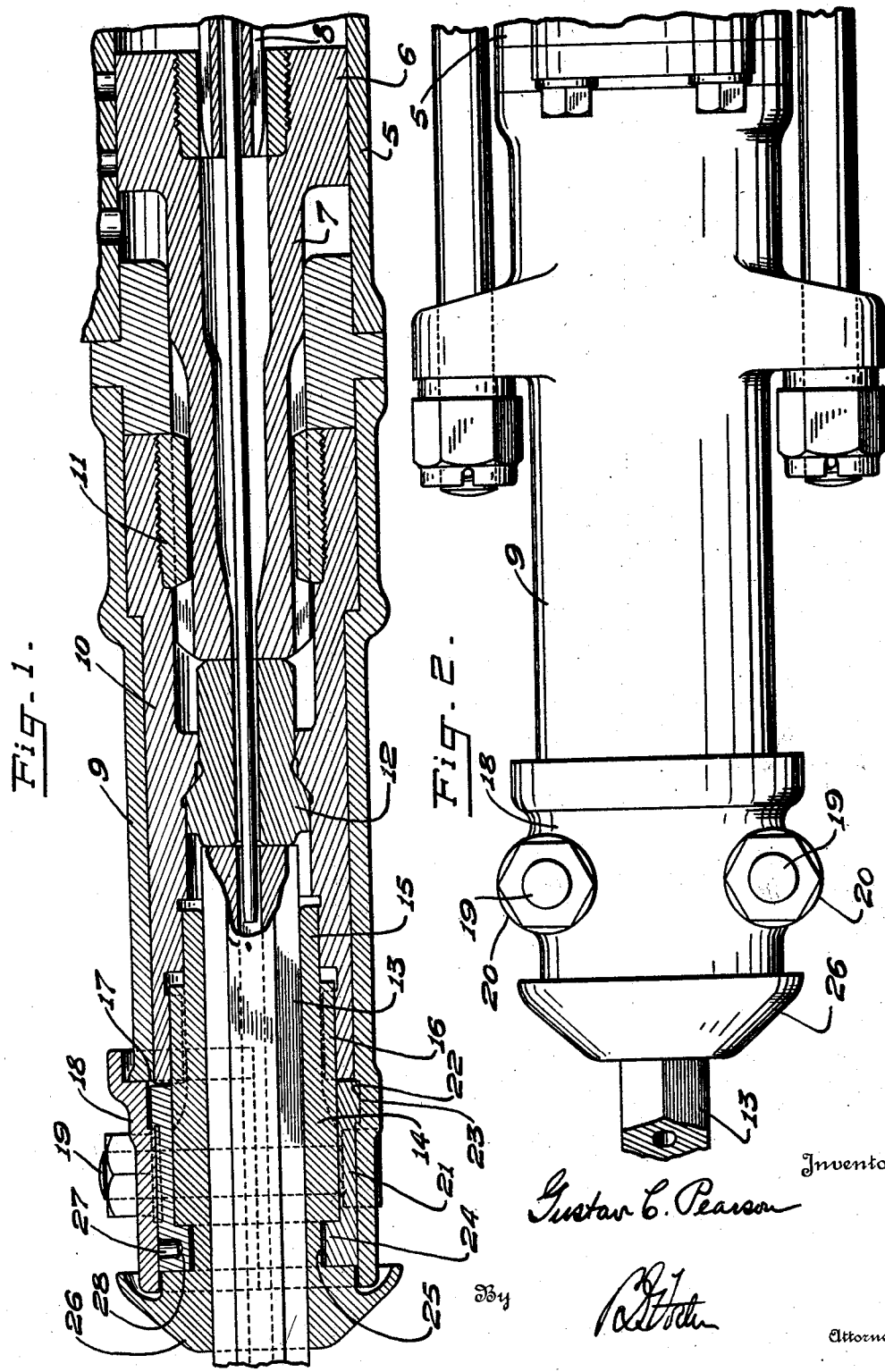

Jan. 13, 1931.  G. C. PEARSON  1,788,629
TOOL CHUCK
Filed Jan. 16, 1928   2 Sheets-Sheet 2

Inventor
Gustav C. Pearson
By
Attorney

Patented Jan. 13, 1931

1,788,629

UNITED STATES PATENT OFFICE

GUSTAV C. PEARSON, OF DENVER, COLORADO, ASSIGNOR TO GARDNER-DENVER COMPANY, OF DENVER, COLORADO, A CORPORATION OF DELAWARE

TOOL CHUCK

Application filed January 16, 1928. Serial No. 247,180.

The present invention relates particularly to chuck structures for rock drills and similar tools, and the object is to provide a novel mechanism which will permit the removal of the tool-holding chuck element without the necessity of detaching the housing or otherwise materially dismembering the mechanism from the tool proper.

The preferred embodiment of the invention is illustrated in the accompanying drawings, wherein:

Figure 1 is a longitudinal sectional view through the chuck end portion of a rock drill equipped with the mechanism.

Figure 2 is a top plan view of the same.

Figure 3:
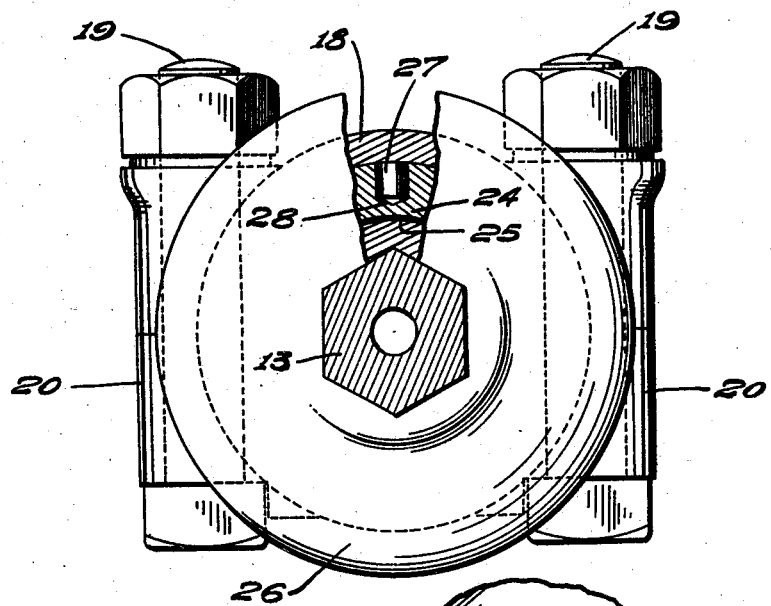
Figure 3 is a front elevation with portions in section.

A portion of the barrel of the tube is shown at 5, and located therein is the usual piston 6 having a hammer extension 7. The usual rifle bar mechanism is employed for effecting the rotation of the piston on its reciprocation, a portion of the rifle bar being illustrated at 8. Mounted on the front end of the barrel 5 is a chuck housing 9 in which is located a rotatable chuck that includes a sleeve 10 journaled in the housing 9. This sleeve has the usual slidable interlocking connection 11 with the hammer extension 7. In the embodiment shown the sleeve 10 also carries a tappet 12 adapted to receive the blows of the piston and transmit them to a drill steel 13 or other tool.

The tool 13 is engaged in a tool-holding chuck member 14 that can be slipped into the front open end of the housing, its rear end 15 entering the front end of the sleeve 10 and said sleeve and chuck having interfitting ribs 16 that serve to insure the rotation of the chuck 14 by the sleeve 10.

Figure 4:
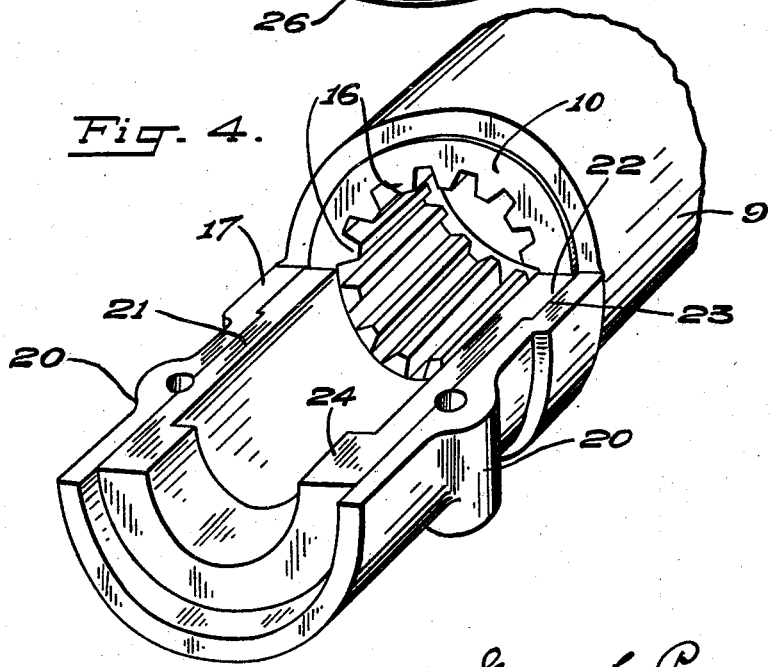
Figure 4 is a detail perspective view of the housing with the cap and chuck member removed.

One side of the front end of the housing 9 is cut away to provide an opening or seat 17, and this is normally closed by a removable cap 18 held in place by transverse bolts 19 that pass through ears 20 formed on the housing 9 on opposite sides of the seat 17. This will be clear by reference to Figure 4.

The chuck 14 is held against longitudinal displacement by a keeper collar 21 preferably formed of two semicircular sections. This collar is provided at its rear end with an outstanding annular flange 22 that is engaged in an internal annular groove 23 formed in the housing 9. The collar is provided at its front end with an inset annular flange 24 engaged in an annular groove 25 formed in the chuck 14. The said chuck preferably terminates at its front end in a hood 26 that overhangs the front end of the housing 9 and cap 18, forming a dirt shield. The cap 18 may have a lug 27 engaged in a socket 28 formed in the front end of one of the keeper sections 21 to hold the keeper against rotation.

When the parts are in place as shown in Figure 1, it will be evident that inasmuch as the keeper collar 21 is interlocked at its rear end with the housing 9 and its front end with the chuck 14, the latter is held against longitudinal displacement, but is capable of free rotation. The keeper collar 21 is however held against rotation because as indicated in Figure 3, the bolts 19 engage the sides of the lower section of the keeper collar 21. This will be clear also by reference to Figure 4, where the bolt openings are shown as formed partly in the ears 20 of the housing 17 and partly in the shown section 21.

When the chuck becomes worn or undesirable from any cause it is only necessary to remove the cap 18, then detach the upper of the sections of the keeper collar 21 by taking it laterally out of the seat 17 of the housing, partially rotate the chuck 14 to bring the other half to the upper side where it is available and remove the other half of the keeper collar, whereupon the chuck can be removed longitudinally from the open front end of the housing, and by a reverse operation, a new chuck can be substituted and secured in place.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

What I claim, is:

1. In a chuck structure, the combination with a chuck housing, of a tubular tool holder removably mounted in the front end of the housing, and having a socket for receiving a tool, and a keeper for the holder detachably located in the housing longitudinally of the housing and holder, said keeper having its inner end interlocked with the housing and its outer end interlocked with the tool holder at one side of the socket.

2. In a chuck structure, the combination with a chuck housing having an opening through its end and a seat opening through one side, of a tubular tool holder mounted in the front end of the housing and removable longitudinally from said front end, said holder having a socket opening through its front end and a keeper for retaining the holder in place extending longitudinally of the housing and holder and located in and laterally removable from the seat, said keeper being located alongside the portion of the holder having the socket and detachably interlocking with the holder and housing.

3. In a chuck structure, the combination with a chuck housing having an opening through its end and a seat opening through one side, of a tubular tool holder mounted in the front end of the housing and removable longitudinally from said front end, said holder having a socket opening through its front end, a keeper for retaining the holder in place located in and laterally removable from the seat, said keeper being located alongside the portion of the holder having the socket and detachably interlocking with the holder and housing, and a closure for the seat covering the keeper and holding it in place.

4. In a chuck structure, the combination with a chuck housing having an opening through its end and a seat opening through one side, of a tubular tool holder rotatably mounted in the front end of the housing and removable longitudinally from said front end, a keeper for retaining the holder in place located in and laterally removable from the seat, and a detachable closure for the seat secured to the chuck housing, said keeper being interlocked with the exterior of the holder and with the closure.

5. In a chuck structure, the combination with a chuck housing having an open end and an open side, of a tubular chuck rotatably mounted in the housing and removable from the open end, said chuck having an open-ended tool-receiving socket, and a keeper collar surrounding the chuck and removable from the open side of the chuck housing.

6. In a chuck structure, the combination with a chuck housing having an open end and an open side, of a chuck rotatably mounted in the housing and removable from the open end, and a sectional keeper collar around the chuck, the sections thereof being separately removable from the open side of the chuck housing.

7. In a chuck structure, the combination with a chuck housing having an open end and an open side, of a chuck rotatably mounted in the housing and removable from the open end, said housing and chuck having annular grooves, a keeper collar surrounding the chuck and comprising separable sections removable through the open side of the chuck housing, said collar having flanges engaging in the grooves of the housing and chuck, a cap detachably covering the open side of the housing, and means for fastening the cap in place.

In testimony whereof, I affix my signature.

GUSTAV C. PEARSON.